United States Patent
Rho et al.

(10) Patent No.: US 11,042,119 B2
(45) Date of Patent: Jun. 22, 2021

(54) DIELECTRIC BASED METASURFACE HOLOGRAM DEVICE AND MANUFACTURING METHOD OF SAME AND DISPLAY DEVICE HAVING SAME

(71) Applicant: POSTECH Academy-Industry Foundation, Pohang-si (KR)

(72) Inventors: Jun Suk Rho, Pohang-si (KR); In Ki Kim, Gimpo-si (KR); Da Sol Lee, Incheon (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 243 days.

(21) Appl. No.: 16/351,731

(22) Filed: Mar. 13, 2019

(65) Prior Publication Data
US 2019/0294104 A1 Sep. 26, 2019

(30) Foreign Application Priority Data
Mar. 22, 2018 (KR) .................. 10-2018-0033235

(51) Int. Cl.
*G03H 1/02* (2006.01)
*G03H 1/22* (2006.01)

(52) U.S. Cl.
CPC ......... *G03H 1/0272* (2013.01); *G03H 1/2205* (2013.01); *G03H 2270/10* (2013.01); *G03H 2270/24* (2013.01)

(58) Field of Classification Search
CPC .............. G03H 1/0272; G03H 1/2205; G03H 2270/10; G03H 2270/24; G03H 2222/32; G03H 2240/11; G03H 1/0244

USPC ........................................................... 359/3
See application file for complete search history.

(56) References Cited

U.S. PATENT DOCUMENTS

| 2015/0219643 A1* | 8/2015 | Song | G01N 21/648 |
| | | | 506/12 |
| 2016/0077261 A1* | 3/2016 | Arbabi | G02B 5/0278 |
| | | | 359/493.01 |

OTHER PUBLICATIONS

Guoxing Zheng et al., "Metasurface holograms reaching 80% efficiency", nature nanotechnology, vol. 10, pp. 308-312, Feb. 23, 2015.
Xingjie Ni et al., "Metasurface holograms for visible light", nature communications, vol. 4, Nov. 15, 2013.
Zile Li et al., "Dielectric Meta-Holograms Enabled with Dual Magnetic Resonances in Visible Light", ACS NANO, vol. 11, No. 9, Sep. 12, 2017.

* cited by examiner

*Primary Examiner* — Jade R Chwasz
(74) *Attorney, Agent, or Firm* — Lex IP Meister, PLLC (57) ABSTRACT

A dielectric based metasurface hologram device includes: a substrate layer provided at a lowermost portion of the dielectric based metasurface hologram device; and a dielectric layer forming a geometric metasurface on the substrate layer. The substrate layer includes a plurality of unit cells which are continuous, and the dielectric layer includes a plurality of nano-structures which are disposed with a predetermined distance therebetween. The single nano-structure is disposed on the unit cell, and a hologram image is formed when an incident light from a light source is reflected by the nano-structure so that a phase of the light is controlled.

16 Claims, 7 Drawing Sheets
(7 of 7 Drawing Sheet(s) Filed in Color)

DIELECTRIC BASED METASURFACE HOLOGRAM DEVICE AND MANUFACTURING METHOD OF SAME AND DISPLAY DEVICE HAVING SAME

TECHNICAL FIELD

The present invention relates to a dielectric based metasurface hologram device, a manufacturing method of the same and a display device including the same.

BACKGROUND

A hologram refers to an image realized by interference phenomenon of light. Specifically, the hologram means a technique capable of reproducing information on each portion of an object in a three-dimensional shape as it is by the interference phenomenon between an object wave reflected from the object and a reference wave propagating straight at a different angle using properties of laser light.

Such holograms may be classified into a transmission-type hologram whose image is generated by the reference wave transmitting through a hologram device, and a reflection-type hologram whose image is generated by the reference wave being reflected by the hologram device, and the reflection-type hologram is generally used in exhibitions, concerts, or anti-counterfeiting or the like.

The conventional reflection-type hologram may be realized using a metal-nonmetal-metal (MIM) structure, or nonmetal structure, but the hologram of the MIM structure has a drawback that it cannot operate within a visible light region, while the hologram of the nonmetal structure using, for example, Titanium Dioxide ($TiO_2$), has a drawback that the structure should have a high aspect ratio due to a refractive index. Moreover, there is a problem that to realize the high aspect ratio may result in an increase in a manufacturing cost of the hologram.

SUMMARY

In view of the above, the present disclosure provides a dielectric based metasurface hologram device capable of being used in a visible light region, a manufacturing method of the same, and a display device including the same.

Further, the disclosure advantageously provides a dielectric based metasurface hologram device capable of being realized at a low cost, a manufacturing method of the same, and a display device including the same.

In accordance with an aspect of the present invention, there is provided a dielectric based metasurface hologram device comprising: a substrate layer provided at a lowermost portion of the dielectric based metasurface hologram device; and a dielectric layer forming a geometric metasurface on the substrate layer, wherein the substrate layer includes a plurality of unit cells which are continuous, and the dielectric layer includes a plurality of nano-structures which are disposed with a predetermined distance therebetween, wherein the single nano-structure is disposed on the unit cell, and wherein a hologram image is formed when an incident light from a light source is reflected by the nano-structure so that a phase of the light is controlled.

The aspect is directed to the dielectric based metasurface hologram device, wherein the nano-structure is formed so as to be inclined at a predetermined angle with respect to a predetermined direction, the predetermined direction being a direction where a phase difference with respect to the incident light is zero.

The aspect is directed to the dielectric based metasurface hologram device, wherein the angle of the nano-structure is designed according to the equations below:

$$\begin{cases} \alpha = \frac{\pi}{4}(|B+R|^2 - |B|^2 - |R|^2) \\ R = e^{0.15 i \xi} \end{cases}$$

where B denotes brightness of binary image (0 or 1), R denotes brightness of reference wave, and $\xi$ denotes random number satisfying a uniform distribution.

The aspect is directed to the dielectric based metasurface hologram device, wherein the nano-structure has a rectangular parallelepiped shape, and has a height ranging from 150 nm to 250 nm.

The aspect is directed to the dielectric based metasurface hologram device, wherein the unit cell is formed in a regular hexahedron shape.

The aspect is directed to the dielectric based metasurface hologram device, wherein a phase distribution is designed by Gerchberg-Saxton algorithm, and wherein when a light reflected on the nano-structure passes through a lens, phase information is converted through Fourier transform to realize a hologram image.

The aspect is directed to the dielectric based metasurface hologram device, wherein the hologram device realizes a hologram of a predetermined pattern, wherein the nano-structures are disposed such that the phase difference by a portion of the nano-structures corresponding to the pattern becomes ½π and the phase difference by a portion of the nano-structures of a background not corresponding to the pattern becomes zero, and wherein a light incident on the nano-structure and a light reflected by the nano-structure interfere with each other, by which a contrast ratio between the portion corresponding to the pattern and the background is generated.

The aspect is directed to the dielectric based metasurface hologram device, wherein the substrate layer is formed with silicon dioxide, and the dielectric layer is formed with amorphous silicon.

The aspect is directed to the dielectric based metasurface hologram device, wherein the substrate layer is provided with silicon, an insulating layer which is silicon dioxide is formed on an upper portion of the substrate layer, and the dielectric layer is amorphous silicon.

The aspect is directed to the dielectric based metasurface hologram device, wherein the insulating layer has a thickness of 2 μm, and the dielectric layer has a thickness of 250 nm.

The aspect is directed to the dielectric based metasurface hologram device, wherein the nano-structure is realized by a lift-off process after Cr deposition via an electron beam evaporator.

The aspect is directed to the hologram device, wherein when polarized light incomes along a direction parallel to a long axis of the nano-structure, a magnetic resonance occurs at a wavelength of 730 nm, while when polarized light incomes along a direction parallel to a short axis of the nano-structure, a magnetic resonance occurs at a wavelength of 660 nm.

The aspect is directed to the hologram device, wherein the one unit cell or a set of the plurality of unit cells displays or display one pixel.

The aspect is directed to the hologram device, wherein when a light polarized along a long axis or a short axis of the nano-structure incomes, the nano-structure causes an electric field having a shape of eddy swirling around the nano-structure in a counterclockwise direction, and causes a strongest magnetic field at a center of the nano-structure.

In accordance with an aspect of the present invention, there is provided a manufacturing method of a dielectric based metasurface hologram device comprising: forming a substrate layer at a lowermost portion of the dielectric based metasurface hologram device; stacking a dielectric layer including a geometric metasurface at the substrate layer; and forming at the dielectric layer a plurality of nano-structures which have a predetermined angle with respect to a predetermined direction and control a phase by reflecting incident light from a light source, wherein the predetermined direction is a direction where a phase difference with respect to the incident light is zero.

The aspect is directed to the method of a dielectric based metasurface hologram device, wherein the substrate layer is provided with silicon, and an insulating layer is deposited on the substrate layer, and wherein the dielectric layer is provided on an upper portion of the substrate layer and is provided with amorphous silicon, whereby a SOI structure is formed.

The aspect is directed to the method of a dielectric based metasurface hologram device, wherein the dielectric layer is realized by a lift-off process after Cr deposition through an electron beam evaporator.

In accordance with an aspect of the present invention, there is provided a display device comprising: a dielectric based metasuface hologram device; and a light source providing light toward the hologram device, wherein the light provided by the light source is reflected on the hologram device to generate a hologram image.

The aspect is directed to the display device, further comprising a screen on which an image is realized by light reflected on the hologram device, wherein the screen has an inclination of 10° with respect to the hologram device, which has an angle of view of 40°×20°.

The aspect is directed to the display device, wherein an image is realized by light reflected on the hologram device on an upper surface of the metasurface of the hologram device.

According to the embodiments of the disclosure, there is an advantage that the dielectric based metasurface hologram device, the manufacturing method of the same and the display device including the same are operable with visible light.

In addition, there is an advantage that they can be realized at a low cost.

Additionally, there is an advantage that the aspect ratio becomes low.

Further, advantageously they can operate without being affected by the polarization condition.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

A more complete understanding of the disclosure, and the advantages and features thereof will be more readily understood by reference to the following detailed description when considered in conjunction with the accompanying drawings wherein.

DETAILED DESCRIPTION

Hereinafter, specific embodiments of the present invention will be explained in detail with reference to the drawings.

Additionally, it is noted that the detailed description for known components or functions may be omitted herein so as not to obscure essential points of the disclosure.

Figure 1:
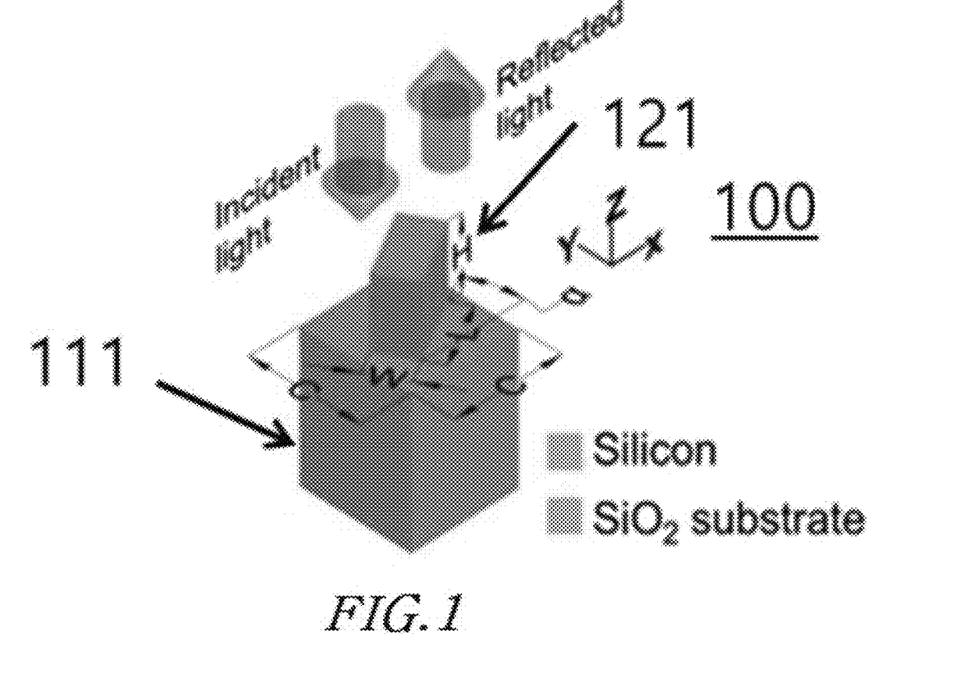
FIG. 1 is a diagram illustrating a part of a dielectric based metasurface hologram device according to an embodiment of the invention.

FIG. 1 is a diagram illustrating a part of a dielectric based metasurface hologram device according to an embodiment of the invention.

For the convenience of explanation, a single unit cell 111 is illustrated as the dielectric based metasurface hologram device 100 shown in FIG. 1.

Referring to FIG. 1, the dielectric based metasurface hologram device 100 according to an embodiment of the invention may comprise a substrate layer 110 provided at a lower portion thereof, and a dielectric layer 120 including a plurality of nano-structures 121 provided on the substrate layer 110. The substrate layer 110 may have a shape of plate having a relatively great surface area in a plane form, and the plurality of nano-structures 121 may be formed on the substrate layer 110. Herein, the unit cell 111 may be defined as a part of the substrate layer 110 within a predetermined range supporting the single nano-structure 121. That is, the unit cells 111 may be continued in a plane direction.

The dielectric based metasurface hologram device 100 according to the embodiment may a device capable of realizing a hologram image using a metamaterial, wherein the metamaterial can be understood as a new artificial material which does not exist in nature, includes both an electric component and a magnetic component, and has a negative refractive index to realize a negative refraction. That is, the substrate layer 110 and the dielectric layer 120 of the embodiment generally function as a metamaterial.

The substrate layer 110, which is provided at a lowermost portion of the dielectric based metasurface hologram device 100, may be provided with silicon dioxide ($SiO_2$), but the material of the substrate layer 110 is not limited thereto. For example, the substrate layer 110 may be provided with silicon, polydimethylsiloxane or the like.

On an upper portion of the substrate layer 110, there may be provided the dielectric layer 120 having the metasurface. Herein, the dielectric layer 120 may be provided with amorphous silicon, and the dielectric layer 120 may be configured of a plurality of nano-structures 121. In this case, each of the nano-structures 121 may be spaced from the adjacent nano-structures 121 by predetermined distances, which distances may be different from or equal to one another. Herein, it may be understood that the distance between the nano-structures 121 is one between centers thereof on a horizontal plane.

Light incident from a separate light source may be reflected on the nano-structure 121, so that the phase can be controlled, thereby forming a hologram image. In this case, the phase means the phase difference between the light incident into the nano-structure 121 and the light reflected by the nano-structure 121, and the two lights having different phases cause interference to change the intensity of the lights.

The dielectric layer 120 configured as described above can function as a metasurface. Herein, the metasurface is a functional thin film made by arranging nano-structures smaller than a wavelength of light operating on the metasurface, and can serve as an antenna whose nano-structures can respectively adjust properties of light, such as a wavelength, a wave surface, a phase, an amplitude and the like. In this case, metal nano-structures constituting the metasurface may have a dimension of several nanometers to several hundred nanometers, and thicknesses and arrangements of the nano-structures may be various. Such metasurface may be manufactured via an electron beam lithography, but the manufacturing method of a metasurface is not limited thereto.

In the embodiment, the dielectric layer 120 may constitute a geometric metasurface (GEMS). In this case, the geometric metasurface means a metasurface which can arbitrarily adjust reflection or phase of light passing through it depending on the geometric structure thereof, and may be based on a Pancharatnam-Berry phase. The dielectric layer 120 may be provided with such geometric metasurface, and the hologram device 100 uses magnetic resonance of the dielectric layer 120 provided with amorphous silicon, whereby an aspect ratio (AR) of the hologram device 100 can be lowered. Specifically, in order to realize a conventional geometric metasurface in which titanium dioxide (TiO$_2$) is used, it was necessary for a metasurface structure to have a height equal to or greater than 600 nm, but the geometric metasurface according to the embodiment in which amorphous silicon is used can realize a hologram with a low aspect ratio as it has a refractive index greater than that of a conventional geometric metasurface, as well as a resonant property that light can be trapped therein for a long time. Therefore, an effect of lowering the unit cost of manufacturing the hologram device 100 can be achieved.

Meanwhile, one nano-structure 121 may be provided so as to correspond to one unit cell 111. Specifically, the substrate layer 110 may be configured of a plurality of unit cells 111, while one nano-structure 121 may be provided to one unit cell 111. In this case, the unit cell 111 may have a form of hexagon, for example, a shape of regular hexagon. In the embodiment, the unit cell 111 having a shape of regular hexagon with the side length C of 400 nm is exemplified.

Each of the nano-structure 121 may be provided on the upper surface of the unit cell 111 at a predetermined angle α (hereinafter, referred to as "angle of the nano-structure") with respect to a direction of polarization of incident light. Herein, the nano-structures 121 may be formed such that the angle of each of the nano-structures 121 is different from each other, or the angles of some of the nano-structures 121 are equal to each other. In this case, the angle of the nano-structure 121 means an angle with respect to a predetermined direction, which means a direction making a phase difference with respect to an incident light be zero. If the angle of the nano-structure 121 is increased linearly, the phase of the light reflected by the nano-structure 121 can also increase linearly.

The nano-structure 121 may have a shape of rectangular parallelepiped, which may have a height H of 220 nm, a width W of 140 nm and a length L of 290 nm. In the embodiment, the width W may mean a short side length, and the length L may be understood as a long side length. Further, the nano-structure 121 is not limited to 220 nm, and, for example, the nano-structure 121 may have a height ranging from 150 nm to 250 nm.

The height, width and length of the nano-structure 121 may have an influence on a frequency band within which a hologram operates, an amplitude of reflected light, and hologram image conversion efficiency. Therefore, the angle of the nano-structure 121 may be determined based on information on phase which is converted from an image to be realized via a numerical analysis method after a general structure is determined using an FDTD (finite-difference time-domain) simulation method.

Further, the nano-structure 121 may be embodied through a lift-off process after Cr deposition via an electron beam evaporator.

Herein, one unit cell 111 may display one pixel when a hologram image is realized, and, for example, a sample image shown in FIGS. 5A to 5G exemplifies a case where each of unit cells arranged in a matrix with 50 rows and 50 columns realizes one pixel. However, a unit cell for displaying one pixel is not limited thereto, and, for example, a plurality of unit cells 111 may display one pixel when a hologram image is realized. Specifically, in a case a set of a plurality of unit cells 111 displays one pixel, when an image with M×N pixels is realized as a hologram, the substrate layer 110 may have M×N unit cell sets, each of which is configured of the plurality of unit cells 111. At this time, a size and a shape of the unit cell set for realizing one pixel may be formed differently according to an embodiment.

Figure 2A:
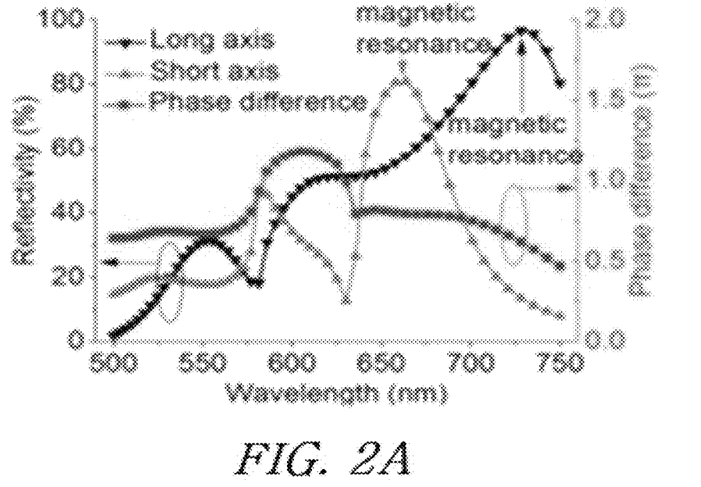
FIGS. 2A and 2B are diagrams illustrating reflectivity and phase difference versus wavelength of the dielectric based metasurface hologram device of FIG. 1.
Figure 2B:
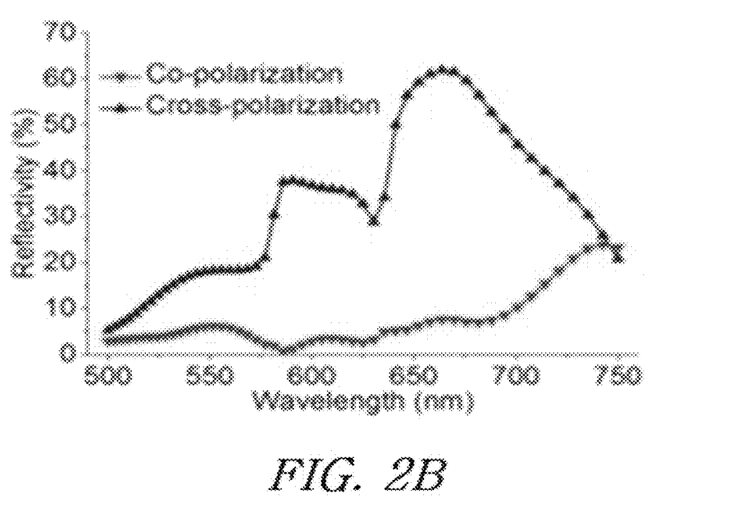

FIGS. 2A and 2B are diagrams illustrating reflectivity and phase difference versus wavelength of the dielectric based metasurface hologram device of FIG. 1. Specifically, FIG. 2A shows a reflectivity and a phase difference of the nano-structure 121 when the perpendicularly incident light is polarized along a direction parallel to a long axis or a short axis of the nano-structure 121, and FIG. 2B shows a reflectivity of the nano-structure 121 according to the co-polarization and the cross-polarization in the incident light having a circular polarization.

Referring to FIG. 2A, it can be understood that when polarized light incomes along a direction parallel to the long axis, magnetic resonance may occur at a wavelength of 730 nm, while when polarized light incomes along a direction parallel to the short axis, magnetic resonance may occur at a wavelength of 660 nm.

FIG. 2B may be conversion efficiencies according to the co-polarization and the cross-polarization, which are calculated through equations below:

$$\begin{cases} \eta_{cross} = \left| \dfrac{r_l - r_s e^{i\delta}}{2} \right|^2 \\ \eta_{co} = \left| \dfrac{r_l - r_s e^{i\delta}}{2} \right|^2 \end{cases}$$

where $r_l$ is a reflection coefficient on the basis of the long axis, $r_s$ is a reflection coefficient on the basis of the short axis, and $\delta$ denotes phase delay between two directions perpendicular to each other.

The reflectivity according to the cross-polarization in FIG. 2B may be a sum of reflectivities at the time of incoming in parallel to the long axis and the short axis of FIG. 2A, and the efficiency of hologram can increase as such reflectivity becomes higher. Herein, as a geometric phase difference, which is the phase delay of light reflected from the geometric metasurface, applies only to a circularly polarized light (for example, LCP) reflected by making a certain circularly polarized light (for example, RCP) income, the efficiency with regard to the cross-polarization can become associated with an efficiency with regard to how much light is practically converted into a hologram image when light incomes.

Specifically, when a cross-polarized light is incident on the nano-structure 121, it can be shown that a high reflectivity of 60% is reached at a wavelength of 660 nm, while when a co-polarized light is incident on the nano-structure 121, it can be seen that a low reflectivity of 10% or less is obtained at a wavelength ranging from 500 nm to 700 nm. Therefore, the unnecessary co-polarization contributing to 0th-order diffraction can be suppressed to 10% or less at a wavelength ranging from 500 nm to 700 nm.

Figure 3A:
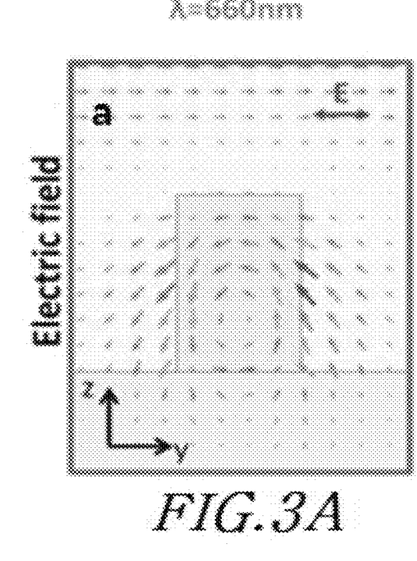
FIGS. 3A, 3B, 3C and 3D are diagrams illustrating electric field distributions and magnetic field distributions according to wavelength of the dielectric based metasurface hologram of FIG. 1.
Figure 3B:
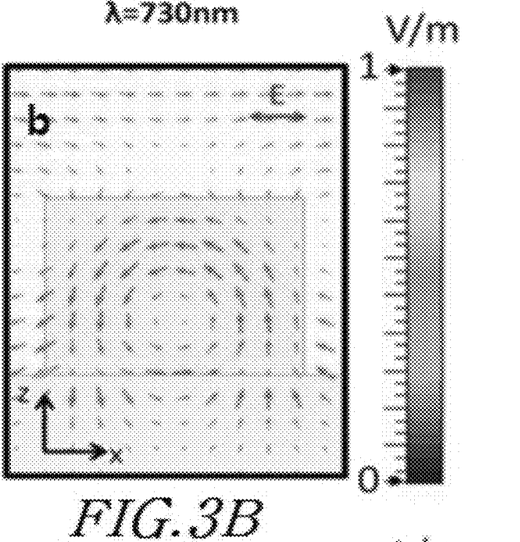
Figure 3C:
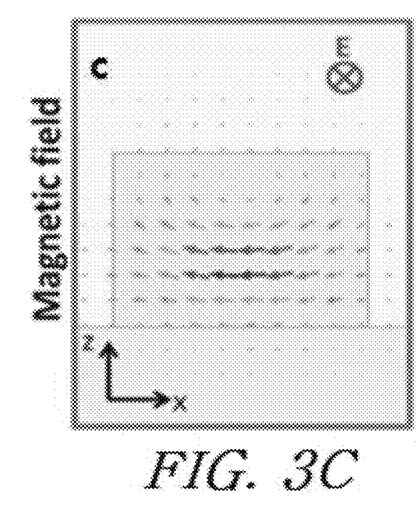
Figure 3D:
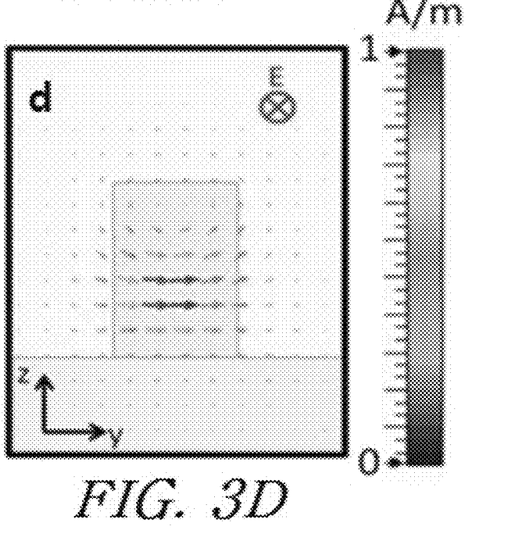

FIGS. 3A to 3D are diagrams illustrating electric field distributions and magnetic field distributions according to wavelength of the dielectric based metasurface hologram device of FIG. 1. Herein, FIGS. 3A and 3C illustrate the electric field distribution and the magnetic field distribution which have a shape of eddy on a cross section of the nano-structure 121 when the polarized light is incident along y-axis (short axis) in FIG. 1 at a wavelength of 660 nm, and FIGS. 3B and 3D illustrate the electric field distribution and the magnetic field distribution which have a shape of eddy on the cross section of the nano-structure 121 when the polarized light is incident along x-axis (long axis) in FIG. 1 at a wavelength of 730 nm.

Referring to FIGS. 3A to 3D, the electric field distribution and the magnetic field distribution in a case where the polarized light is incident on the nano-structure 121 can be understood. In this case, a color in the electric field and the magnetic field may denote an intensity of light, and arrows therein may denote a power flow.

Specifically, referring to FIGS. 3A and 3B, the electric field excited in the nano-structure 121 may generate a shape of an eddy swirling around the nano-structure in a counterclockwise. At this time, the counterclockwise electric field can generate a magnetic field by Fleming's right hand rule in a direction in which light is reflected from the nano-structure 121 (see FIGS. 3B and 3D). Therefore, in FIG. 3B, the magnetic field may be distributed in a direction parallel to the long axis, and in FIG. 3D, the magnetic field may be distributed in a direction parallel to the short axis.

Further, it can be shown that arrows of a central side of the nano-structure 121 are red in color, and it can be understood that the strongest magnetic field is generated in the central side of the nano-structure 121. Accordingly, excitation of magnetic dipole resonance can be generated along the long axis and the short axis of the nano-structure 121.

Figure 4A:
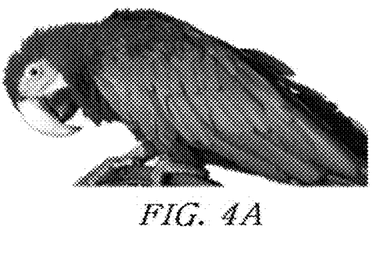
FIGS. 4A, 4B, 4C and 4D are diagrams illustrating phase distribution of Fourier hologram according to the dielectric based metasurface hologram device of FIG. 1 and images realized through the hologram device.
Figure 4B:
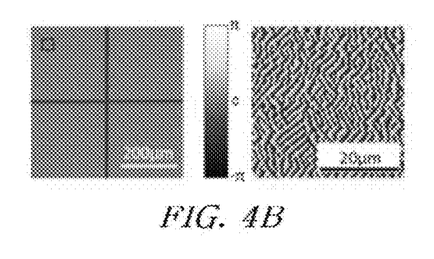
Figure 4C:
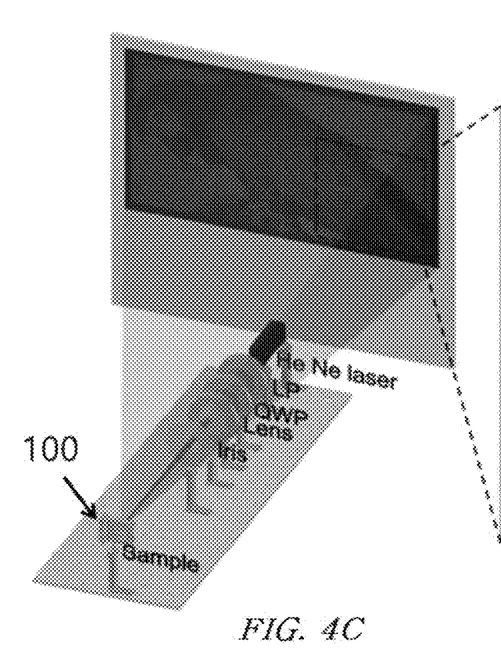
Figure 4D:
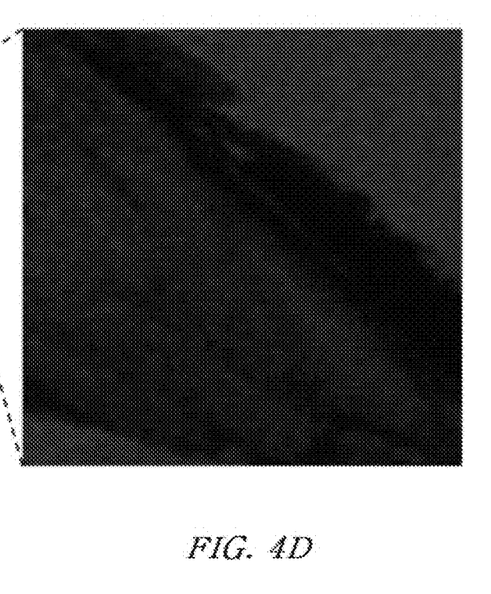

FIGS. 4A to 4D are diagrams illustrating phase distribution of Fourier hologram according to the dielectric based metasurface hologram device of FIG. 1 and images realized via the hologram device. Herein, FIG. 4A is an image of a parrot used as an example, FIG. 4B illustrates a whole of phase distribution designed to generate hologram image of the example at a remote distance and a portion of upper left corner which is enlarged to 100×100 pixels, FIG. 4C illustrates a reflection-type Fourier hologram image under incidence of circularly polarized light and an installation state of the hologram device 100 for the image, and FIG. 4D is a partial enlarged view of FIG. 4C. In this case, the hologram device 100 may have an operation wavelength of 632.8 nm.

Specifically, referring to FIGS. 4A to 4D, the parrot of FIG. 4A can be realized on a screen (a reference sign is not given) through the hologram device 100. At this time, the image of the parrot used as an example has 712×351 pixels, and a grayscale of 256. Further, the hologram device 100 may be a Fourier hologram device which extracts phases by Fourier transform, and phase distribution may be designed by Gerchberg-Saxton algorithm. When light reflected on the metasurface of such Fourier hologram device 100 passes through a lens, the phase information can be converted to an image through Fourier transform, and this holographic image can be realized on a screen at a remote distance. At this time, the hologram device 100 may include a fragment configured of the substrate layer 110 and the dielectric layer 120, the fragment having a configuration of 2×2 array and a surface area of 250×250 μm².

The parrot of FIG. 4A may be realized on the screen by causing light which have passed through a linear polarizer LP, a wave plate QWP, the lens and an iris to be reflected on the hologram device 100. Here, a light source may be He Ne laser, and the iris may function to adjust a size of the polarized light. That is, the polarized light whose size has been adjusted via the iris may be reflected on the hologram device 100. It can be understood that the image realized on the screen via the hologram device 100 can have a high accuracy as in FIG. 4D. That is, the Fourier hologram device 100 can realize a hologram image with a high accuracy on a screen at a remote distance using the silicon substrate layer 110.

In this case, the image realized via the hologram device 100 may be provided to have an inclination of 10° with respect to the hologram device 100 in order to avoid overlap with $0^{th}$ order spot. It is noted that $0^{th}$ order spot means a beam reflected on the metasurface so as to have same shape as light incident on the metasurface when laser light is incident on the metasurface, and such beam may cause a hologram image to appear relatively less clear as it is much stronger than adjacent lights during a process of capturing the hologram image as a CCD image. Additionally, the hologram device 100 may have an angle of view of 40°×20°, the screen may be provided so as to be spaced apart from the hologram device 100 by 300 nm, and however, the distance between the screen and the hologram device 100 is not limited thereto.

Hereinafter, a dielectric based metasurface hologram device according to another embodiment will be described with reference to FIGS. 5A to 5G, 6A and 6B. However, another embodiment is different from one embodiment in that a screen on which an image appears is not provided, and thus such different feature will be mainly described, while reference to the above-described embodiment will be made for the description and reference signs of same parts.

Figure 5A:
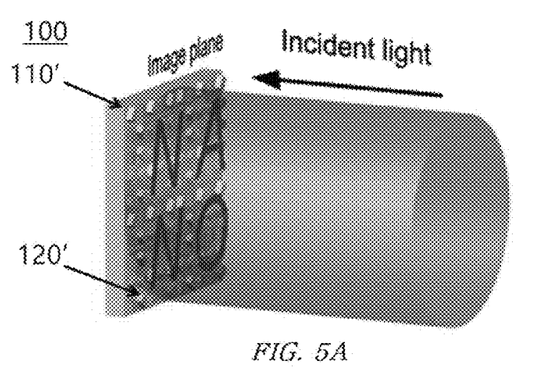
FIGS. 5A, 5B, 5C, 5D, 5E, 5F and 5G are diagrams illustrating a phase distribution, a SEM image and optical images under a variety of illumination conditions of the dielectric based metasurface hologram device according to another embodiment of the present invention.
Figure 5B:
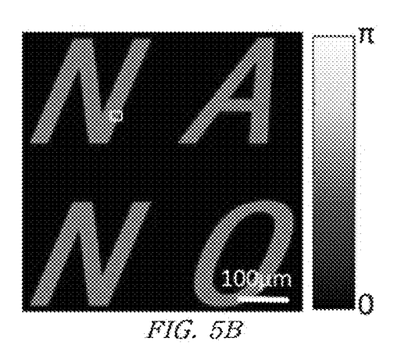
Figure 5C:
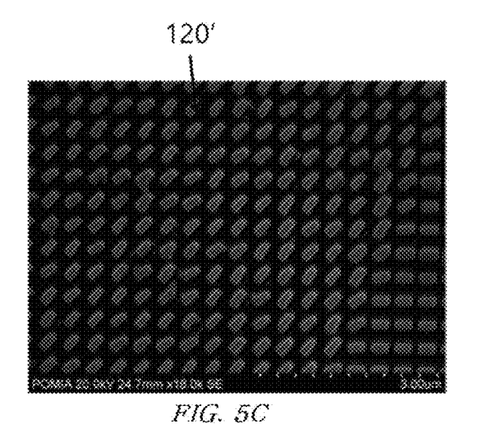
Figure 5D:
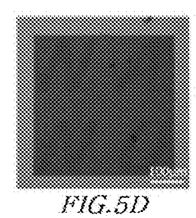
Figure 5E:
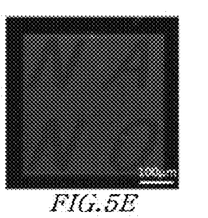
Figure 5F:
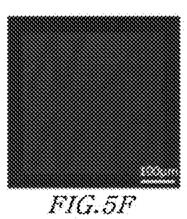
Figure 5G:
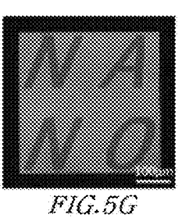
Figure 6A:
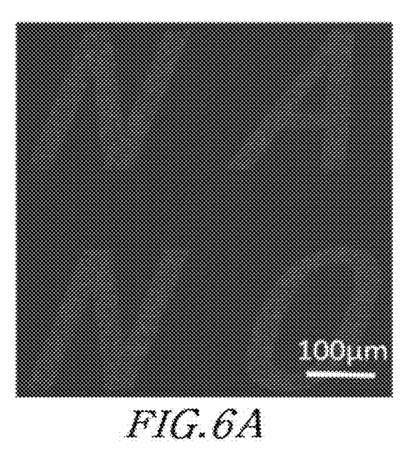
FIGS. 6A and 6B are diagrams illustrating exemplary images according to the dielectric based metasurface hologram device of FIGS. 5A to 5G.
Figure 6B:
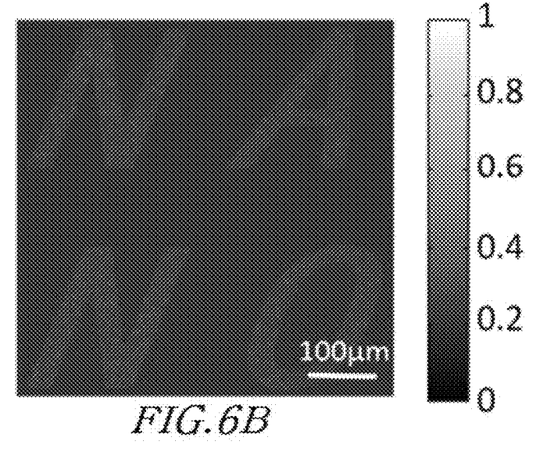

FIGS. 5A to 5G are a phase distribution, a SEM image and optical images according to different illuminations in a dielectric based metasurface hologram device according to another embodiment of the present invention, and FIGS. 6A and 6B are diagrams illustrating exemplary images according to the dielectric based metasurface hologram device of FIGS. 5A to 5G.

Holograms realized by the embodiment of FIGS. 5A to 5G, 6A and 6B are referred to as "image holograms" in distinction from the Fourier hologram of FIG. 4. Herein, the image hologram means that light diffracted on a metasurface in which phase information is accommodated forms an image immediately above the metasurface. Specifically, FIG. 5A illustrates a operation principle of a dielectric GEMS image hologram device 100', FIG. 5B is the phase distribution designed to generate a word, NANO, FIG. 5C is the SEM image of nano-structures 121', FIGS. 5D and 5E are optical microscope images respectively illuminated by a halogen lamp and a mobile phone flashlight when the height of the nano-structure 121' is 220 nm, and FIGS. 5F and 5G are optical microscope images respectively illuminated by the halogen lamp and the mobile phone flashlight when the height of the nano-structure 121' is 150 nm.

Further, FIG. 6A is an optical image according to right-circularly polarized light, and FIG. 6B is an optical image according to left-circularly polarized light.

Referring to FIGS. 5A to 5G, 6A and 6B, the dielectric based metasurface hologram device 100' according to another embodiment of the present invention may not be provided with a screen on which an image is realized, and an image which is reflected on the hologram device 100' to be realized may be provided above an upper surface of the hologram device 100'. At this time, the upper surface of the hologram device 100' may be a surface which is opposed to a light source and on which the nano-structures 121 are provided. Specifically, light diffracted on the metasurface of the hologram device 100' may realize an image in the upper surface of the metasurface.

The hologram device 100' may be manufactured via electron beam lithography, and may have 1250×1250 pixels, in which the phase distribution of the hologram device 100' may be same as FIG. 5B. Further, referring to FIG. 5C, a portion of the nano-structures 121' which expresses the characters, NANO, may be inclined at a predetermined angle, and sets of such unit cells may realize one image. In this case, an angle of the nano-structure 121' may be designed by equations below:

$$\begin{cases} \alpha = \dfrac{\pi}{4}(|B+R|^2 - |B|^2 - |R|^2) \\ R = e^{0.15i\xi} \end{cases}$$

where B denotes brightness of binary image (0 or 1), R denotes brightness of reference wave, and ξ denotes random number satisfying a uniform distribution.

In the embodiment, an example including the NANO pattern was used to realize a predetermined pattern, in which a grayscale difference between the pattern and a background not corresponding to the pattern may be caused by the phase difference. Specifically, the NANO pattern may be realized using the metasurface by adjusting phase difference between light reflected on the pattern and light reflected on the background and thus adjusting a contrast ratio. As shown in FIG. 5B, the nano-structure 121' of the background may be arranged such that the phase difference by the nano-structure 121' becomes zero, and thus there is no the phase difference between the incident light and the reflected light, whereas the nano-structure 121' corresponding to the pattern NANO may be arranged such that the phase difference by the nano-structure 121' becomes ½π, thus causing the incident light and the reflected light to interfere with each other and the intensity of light to be changed. Therefore, the contrast ratio between the background and the pattern may be caused, by which the pattern NANO can be realized. That is, as the hologram device 100' has a simple phase distribution, it is not necessary to convert phase information additionally via a lens or the like.

Moreover, the hologram device 100' may produce an image under a variety of illumination conditions. In particular, as shown in FIGS. 5D to 5G, the hologram device 100' can have a clear optical image with regardless of the illumination conditions.

Further, referring to FIG. 6, the hologram device 100' can provide an image by RCP and an image by LCP whose visibilities are similar to each other. That is, the hologram device 100' may not be influenced by the polarization condition, and thus can be employed in various fields, such as anti-counterfeiting, information security, a display and the like.

Hereinafter, a dielectric based metasurface hologram device according to still another embodiment of the present invention will be described with reference to FIGS. 7A to 7D. However, as still another embodiment is different from one embodiment in the substrate layer, and thus such different feature will be mainly described, while reference to the above-described embodiment will be made for the description and reference signs of same parts.

Figure 7A:
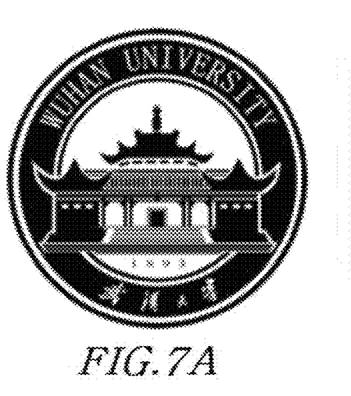
FIGS. 7A, 7B, 7C and 7D are diagrams illustrating a phase distribution, a SEM image and optical images under a variety of illumination conditions of the dielectric based metasurface hologram device according to still another embodiment of the present invention.
Figure 7B:
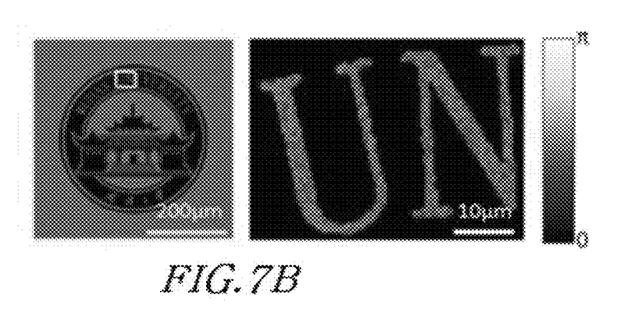
Figure 7C:
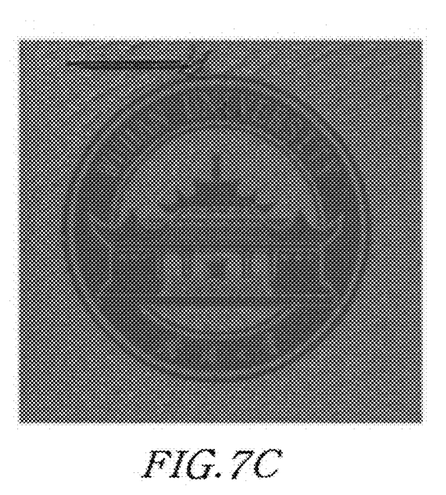
Figure 7D:
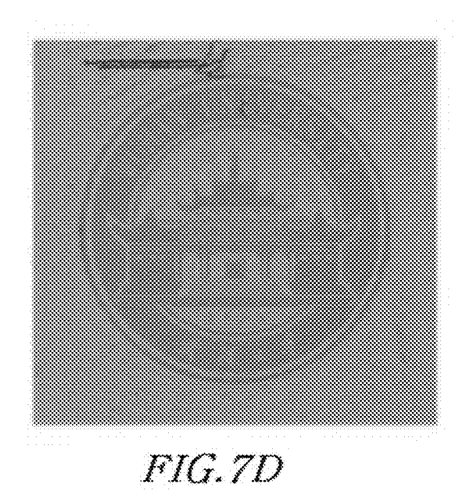

FIGS. 7A to 7D are diagrams illustrating a phase distribution, a SEM image and optical images under a variety of illumination conditions of the dielectric based metasurface hologram device according to still another embodiment of the present invention. Herein, FIG. 7A is a university logo used as an example, FIG. 7B is a whole and partially enlarged views of the phase distribution designed to realize the logo of FIG. 7A, and FIGS. 7C and 7D are optical microscope images illuminated by natural light and a mobile phone flashlight respectively.

Referring to FIGS. 7A to 7D, the dielectric based metasurface hologram device 100" according to still another embodiment of the present invention may be provided with a SOI (silicon on insulator) structure. Specifically, a substrate layer 110" of the hologram device 100" may be provided with silicon, and an insulating layer may be formed on an upper portion. In this case, the insulating layer may be silicon dioxide (SiO$_2$). Therefore, by providing a dielectric layer 120" provided with amorphous silicon on the upper portion of the silicon substrate 110" on which the silicon dioxide (SiO$_2$) is deposited, the hologram device 100" can be provided with the SOI structure.

In this case, the insulating layer deposited on the substrate layer 110" may have a thickness of 2 μm, the dielectric layer 120" may be provided with a thickness of 250 nm, and however, the spirit of the invention is not limited thereto.

Further, the hologram device 100" may be provided with a size of 500×500 μm$^2$, and as shown in FIGS. 7C and 7D, the hologram device 100" can realize images under a variety of illumination conditions.

While the dielectric based metasurface hologram device, a manufacturing method of the same and a device including the same according to examples of the present invention are described as concrete embodiments herein, these are just exemplary embodiments, and the present invention should be construed in a broadest scope based on the fundamental ideas disclosed herein, rather than being limited thereto. By combining or replacing a part or parts of embodiments disclosed herein, ordinary skilled in the art may carry out a type of form which is not explicitly described herein, and however, it should be noted that it is not depart from the scope of the present invention. Besides, ordinary skilled in the art may easily change or modify embodiments disclosed herein based on the disclosure, and however, it is obvious that such change or modification also falls within the scope of the present invention.

What is claimed is:

1. A dielectric based metasurface hologram device comprising:
    a substrate layer provided at a lowermost portion of the dielectric based metasurface hologram device; and
    a dielectric layer forming a geometric metasurface on the substrate layer,
    wherein the substrate layer includes a plurality of unit cells which are continuous, and the dielectric layer includes a plurality of nano-structures which are disposed with a predetermined distance therebetween,
    wherein a single nano-structure is disposed on the unit cell,
    wherein a hologram image is formed when an incident light from a light source is reflected by the nano-structure so that a phase of the incident light is controlled, and
    wherein the hologram device realizes a hologram of a predetermined pattern,
    wherein the nano-structures are disposed such that a phase difference between the incident light on the nano-structure and a light reflected by the nano-structure by a portion of the nano-structures corresponding to the pattern becomes $1/2\pi$ and a phase difference between the incident light on the nano-structure and a light reflected by a portion of the nano-structures of a background not corresponding to the pattern becomes zero, and
    wherein the incident light on the nano-structure and the light reflected by the nano-structure interfere with each other, by which a contrast ratio between the portion corresponding to the pattern and the background is generated.

2. The dielectric based metasurface hologram of claim 1, wherein the nano-structure is formed so as to be inclined at a predetermined angle with respect to a predetermined direction, the predetermined direction being a direction where a phase difference with respect to the incident light is zero.

3. The dielectric based metasurface hologram of claim 2, wherein the angle of the nano-structure is designed according to the equations below:

$$\begin{cases} \alpha = \frac{\pi}{4}(|B+R|^2 - |B|^2 - |R|^2) \\ R = e^{0.15 i \xi} \end{cases}$$

where B denotes brightness of binary image (0 or 1), R denotes brightness of reference wave, and denotes random number satisfying a uniform distribution.

4. The dielectric based metasurface hologram of claim 2, wherein the nano-structure has a rectangular parallelepiped shape, and has a height ranging from 150 nm to 250 nm.

5. The dielectric based metasurface hologram of claim 1, wherein the unit cell is formed in a regular hexahedron shape.

6. The dielectric based metasurface hologram of claim 1, wherein a phase distribution is designed by Gerchberg-Saxton algorithm, and
    wherein when the light reflected by the nano-structure passes through a lens, phase information is converted through Fourier transform to realize the hologram image.

7. The dielectric based metasurface hologram of claim 1, wherein the substrate layer is formed with silicon dioxide, and the dielectric layer is formed with amorphous silicon.

8. The dielectric based metasurface hologram of claim 1, wherein the substrate layer is provided with silicon, an insulating layer which is silicon dioxide is formed on an upper portion of the substrate layer, and the dielectric layer is amorphous silicon.

9. The dielectric based metasurface hologram of claim 8, wherein the insulating layer has a thickness of 2 μm, and the dielectric layer has a thickness of 250 nm.

10. The dielectric based metasurface hologram device of claim 1, wherein the nano-structure is realized by a lift-off process after Cr deposition via an electron beam evaporator.

11. The dielectric based metasurface hologram of claim 1, wherein when polarized light incomes along a direction parallel to a long axis of the nano-structure, a magnetic resonance occurs at a wavelength of 730 nm, while when polarized light incomes along a direction parallel to a short axis of the nano-structure, a magnetic resonance occurs at a wavelength of 660 nm.

12. The dielectric based metasurface hologram of claim 1, wherein the one unit cell or a set of the plurality of unit cells displays or display one pixel.

13. The dielectric based metasurface hologram of claim 1, wherein when a light polarized along a long axis or a short axis of the nano-structure incomes, the nano-structure causes an electric field having a shape of eddy swirling around the nano-structure in a counterclockwise direction, and causes a strongest magnetic field at a center of the nano-structure.

14. A display device comprising:
    the dielectric based metasuface hologram device of claim 1; and
    the light source providing light toward the hologram device,
    wherein the light provided by the light source is reflected by the hologram device to generate the hologram image.

15. The display device of claim 14, further comprising a screen on which the hologram image is realized by the light reflected by the hologram device, wherein the screen has an inclination of 10° with respect to the hologram device, which has an angle of view of 40°×20°.

16. The display device of claim 14, wherein the hologram image is realized by the light reflected by the hologram device on an upper surface of the metasurface of the hologram device.

* * * * *